May 18, 1926.  1,585,275
E. A. ALBRECHT
DEVICE FOR TRANSPORTING PAPER, FABRICS, AND THE LIKE
Filed Oct. 27, 1925
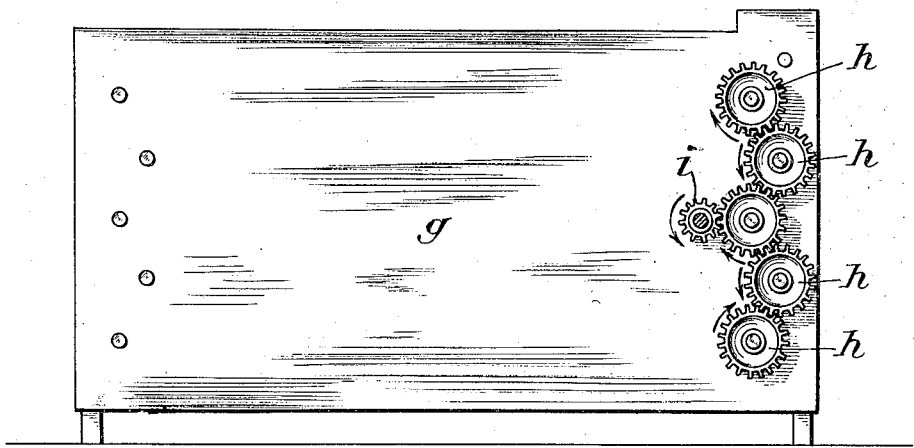
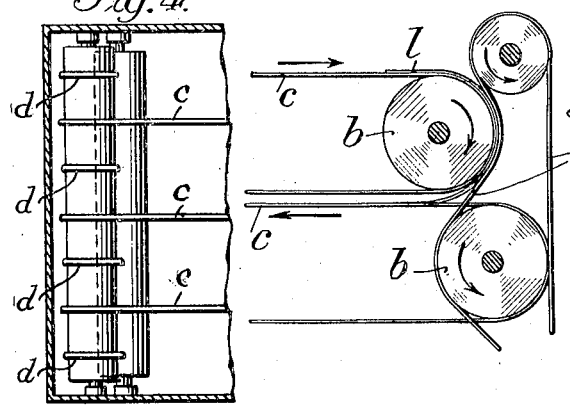
Inventor:
Eugen A. Albrecht,
By Henry Orth Jr.
atty Patented May 18, 1926.

1,585,275

UNITED STATES PATENT OFFICE.

EUGEN ALFRED ALBRECHT, OF ZURICH, SWITZERLAND.

DEVICE FOR TRANSPORTING PAPER, FABRICS, AND THE LIKE.

Application filed October 27, 1925. Serial No. 65,205.

With devices for drying yarn, wool and the like it is known to feed the material to be dried between two endless conveying aprons which are so arranged that one apron lies upon the other and both aprons run in the conveying path over the same guide rollers whereby the material is held between and caused to follow the two traveling aprons, the guide rollers of which are so disposed that different conveying paths one situated above the other are obtained.

The subject matter of the present invention is a device for conveying paper, fabrics and the like having conveying paths arranged one above the other and formed of endless conveying elements and being provided with endless transferring members which cause the article to be conveyed to move from one conveying path to the next and which are so arranged between each row of guide rollers formed by the rollers situated one above the other that the guide rollers of each row are alternately within and without their corresponding transferring member. This conveying device is preferably used in the developing of exposed photogenic paper by means of chemically active gases or vapours, whereby the goods to be conveyed are transported through the developing chamber by means of the conveying elements of the transporting device during an appropriate period of time, thus avoiding an undue length of the developing chamber. The goods to be conveyed are not continuously pressed between two conveying aprons as is the case with the above mentioned known transporting device but are freely supported on the conveying elements and the active vapours have free access to the conveyed goods.

A constructional example of the subject matter of the present invention is diagrammatically illustrated on the accompanying drawings, in which:—

Fig. 1 shows the transporting device in elevation,

Fig. 2 is a sectional elevation,

Fig. 3 shows a detail on an enlarged scale, and

Fig. 4 is a plan view of the left hand end of the conveyor rollers and belts.

In the transporting device two rows of guide rollers arranged opposite each other are provided, each of the rows consisting for example of five guide rollers $a$ and $b$ respectively arranged one above the other to both sides of a vertical plane. Around every two corresponding guide rollers $a$ and $b$ conveying organs $c$ are placed in regular distances from each other. The conveying organs preferably consist of strings, cords, small belts, straps and the like spaced at regular distances and each string or the like forms an endless band guided by the rollers $a$ and $b$. With the five rollers $a$ of the one row of rollers the endless transferring member $d$, consisting also of endless strings, belts and the like spaced at regular distances, cooperates. The guide rollers $b$, with the exception of the lowest guide roller, cooperate with the endless transferring member $e$ which passes over the top guide roller $f$. The whole transporting device is enclosed in a casing $g$. The guide rollers $b$ are provided with intermeshing gear wheels $h$ arranged on the axle of the guide rollers outside the casing $g$. The gear wheels are rotated by a driving pinion $i$ engaging with the middle gear wheel. The gear wheels cause every two guide rollers arranged above each other to rotate in opposite directions and cause thereby the adjacent endless conveying organs $c$ to move in opposite directions. The endless transferring members $d$ and $e$ respectively are so arranged between the guide rollers of a row of rollers that the guide rollers are situated alternately within and without the endless transferring members and the latter are driven by these rollers. The conveying organs $c$ of every next but one conveying layer are thus crossed by the transferring members.

Paper, fabrics or the like introduced through a slot provided in the top plate of the chamber are caught by the moving transferring member $e$ and brought to the conveying organ of the next guide rollers, whereupon the goods 1 (paper, fabrics and the like) are alternately transferred by the transferring members $d$ and $e$ respectively from one conveying organ to the next lower conveying organ until they leave the device at the lowest conveying organ through a slot $m$ provided in a side wall of the casing. Fig. 3 of the drawings shows a sheet of paper 1 which is just being transferred from one conveying path to the next conveying path.

The above described transporting device is particularly adapted for use with developing exposed photogenic paper in vapours. The latter are introduced into the casing $g$ or generated in the latter by the evaporation of a suitable liquid, whereupon the paper is moved during an appropriate period on the conveying cords $c$ through the vapours. In a similar manner fabrics moved by the conveying members $c$ may be steamed, bleached or acted upon in another manner inside the casing. By heating the space enclosed by the casing $g$ a drying action can be obtained on paper, fabric and the like placed on the conveying members.

I claim:

1. A device for transporting paper, fabrics and the like, comprising in combination, a casing, a number of guide rollers arranged substantially in two vertical rows at both ends of said casing, sets of a plurality of endless conveying organs distanced from each other, each set being guided by one roller of the one row of rollers and a corresponding roller of the other row of rollers whereby a plurality of independent vertically spaced conveying paths are obtained, a plurality of endless strings passing between the guide rollers of each row of guide rollers and adapted to transfer goods from one conveying path to the next, and driving means adapted to rotate the adjacent guide rollers of one row of rollers in opposite direction.

2. A device for transporting paper, fabrics and the like, comprising in combination, a casing, a number of horizontally disposed guide rollers arranged substantially in two vertical rows at both ends of said casing, sets of a plurality of endless conveying organs horizontally spaced from each other, each set being guided by one roller of the one row of rollers and a corresponding roller of the other row of rollers whereby a plurality of independent conveying paths one arranged above the other are obtained, a plurality of spaced endless strings passing between adjacent guide rollers of each row of guide rollers and adapted to transfer goods from one conveying path to the next, and intermeshing gear wheels driving the adjacent guide rollers of one row of rollers in opposite directions.

In testimony whereof, I have signed my name to this specification.

EUGEN ALFRED ALBRECHT.